C. L. SMITH AND E. S. WEBSTER.
BELT VULCANIZING MOLD.
APPLICATION FILED OCT. 15, 1919.

1,375,473.

Patented Apr. 19, 1921.

Clyde L. Smith
Emmett S. Webster.
INVENTORS

By George J. Ottsch
ATTORNEY

UNITED STATES PATENT OFFICE.

CLYDE L. SMITH AND EMMETT S. WEBSTER, OF SOUTH BEND, INDIANA.

BELT-VULCANIZING MOLD.

1,375,473.　　　　　Specification of Letters Patent.　　Patented Apr. 19, 1921.

Application filed October 15, 1919. Serial No. 330,932.

*To all whom it may concern:*

Be it known that we, CLYDE L. SMITH and EMMETT S. WEBSTER, citizens of the United States, residing at South Bend, in the county of St. Joseph and State of Indiana, have invented certain new and useful Improvements in Belt-Vulcanizing Molds, of which the following is a specification.

The invention relates to a vulcanizing mold particularly adapted for the manufacture of endless belts.

The object of the invention resides in the provision of a vulcanizing mold usable in part as a mounting or former upon which the belt material is arranged preliminary to the vulcanizing process, and means coöperating with said part to confine and compress the belt material in the form of the ultimate product during the vulcanizing treatment. A further object resides in the provision of a mold of the character noted which is of few parts, easily and quickly manipulated, and which is highly efficient for making belts of a high quality by the use of laminated rubberized fabric strips securely united by vulcanization.

With the above and other objects in view, the invention in the preferred form of details will be described in the following specification, reference being had particularly to the accompanying drawings, in which:—

Figure 1:
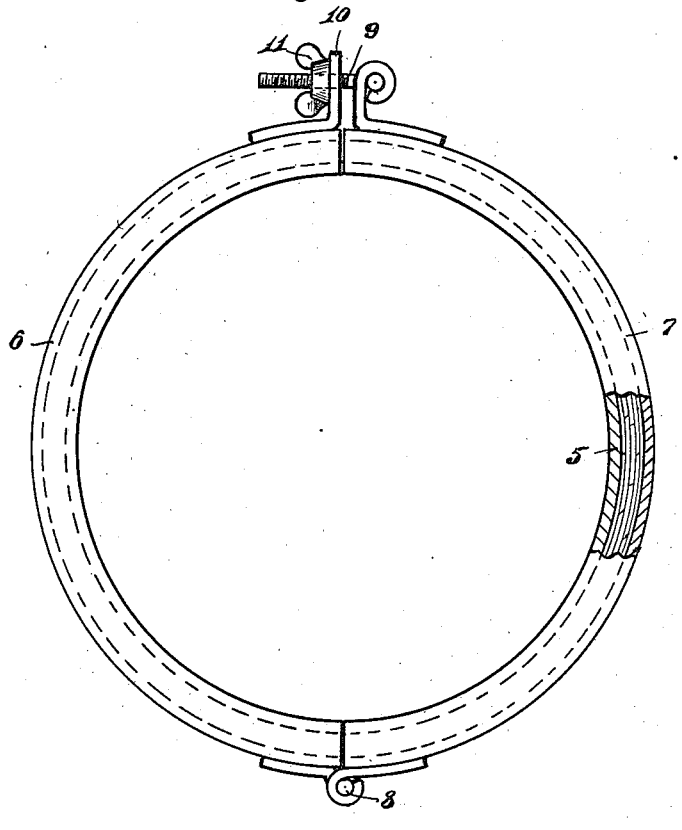
Figure 1 is a side elevation of a mold embodying the invention.
Figure 2:
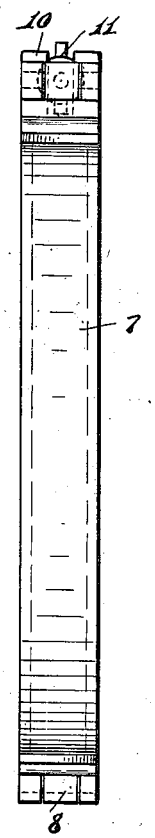
Fig. 2 is an edge elevation thereof.
Figure 3:
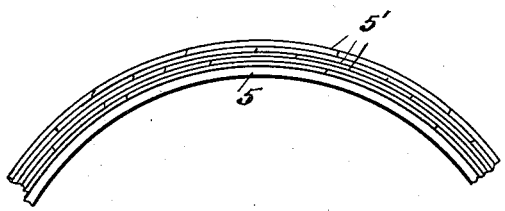
Fig. 3 is a fragmentary view of one of the mold parts, showing the manner of mounting the belt material thereon preliminary to the vulcanizing process.
Figure 4:
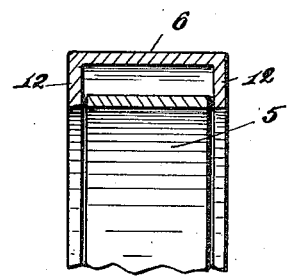
Fig. 4 is a fragmentary view, partly in cross-section, showing the parts arranged in mold forming relation.

The improved mold is particularly adapted for making drive belts built up of a number of layers of rubberized fabric bound together by the process of vulcanization, and by the use of such material to produce a very serviceable belt made up of cuttings or scrap pieces remaining in the manufacture of rubber tires or casings, which is now practically a waste product and representing a material economic loss.

The mold comprises a metallic ring 5, upon which the strips of fabric 5' are arranged upon each other until the desired belt thickness is obtained, the stickiness of the rubber coating causing the strips to adhere to one another as applied one on the other, and thus permitting the belt to be rapidly and easily built up on the ring. Adapted to encompass the belt material thus mounted on the ring 5, is a sectional ring, preferably of two parts 6 and 7, hingedly connected at 8, and provided at their free ends with means for drawing the sections together. Said means preferably consists of a screw bolt 9 hingedly supported in the manner shown adjacent the free end of one of the sections, and a slotted lug 10 on the free end of the other section adapted to receive the bolt, whereby, upon manipulation of a nut 11 on said bolt, the free ends of the sectional ring may be drawn together, and the assembled belt material clamped and compressed between the two rings. The sectional ring is provided with inwardly projecting marginal flanges 12, which are adapted to overlap the side edges of the mounting ring 5 and the material arranged thereon, so that the latter is completely incased and held to form during the vulcanizing process, which may be accomplished by placement of the mold in any suitable vulcanizing oven.

It will be apparent from the foregoing, that one element of the mold also serves as a mounting or former, upon which the fabric strips are assembled, thus providing a mold of few parts and simple construction, and by means of which highly serviceable belts may be quickly and cheaply made of scrap pieces of rubberized fabric.

While the foregoing is the preferred form of embodiment of the invention, it is to be understood that we do not limit ourselves to the precise structure shown and described, as it is obvious that the same may be variously modified without departing from the spirit of the invention.

Having thus described the invention, what is claimed is:—

1. A vulcanizing mold for making endless belts comprising a mounting ring for assembling the belt material thereon, a sectional channeled ring adapted to encompass the mounting ring to form a circular chamber, and means for drawing said ring sections together to confine and compress the belt material within said chamber.

2. A vulcanizing mold for making endless belts comprising a mounting ring for assembling the belt material thereon, a channeled ring of hingedly connected sections adapted to encompass the mounting ring to form an annular chamber, and means carried by the free ends of said sections for drawing the same together to confine and compress the material.

3. A vulcanizing mold for making endless belts comprising a mounting ring for the belt material, a channel ring of hingedly connected sections adapted to encompass the mounting ring to form an annular chamber, a screw-bolt hingedly mounted on the free end of one of said sections, a slotted lug projecting from the free end of the other section adapted to receive the screw-bolt, and a nut on the bolt operable for drawing the sections together.

In testimony whereof we affix our signatures.

CLYDE L. SMITH.
EMMETT S. WEBSTER.